Feb. 21, 1967   J. R. SHACKELFORD   3,304,830
EXPANSIBLE HOLLOW RIVET HAVING A POLYGONAL SHANK
Original Filed Aug. 9, 1960
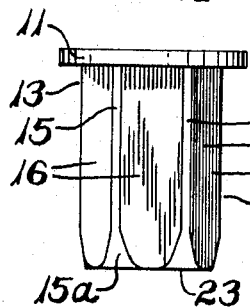
FIG. 1
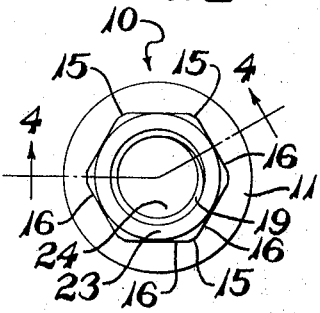
FIG. 2
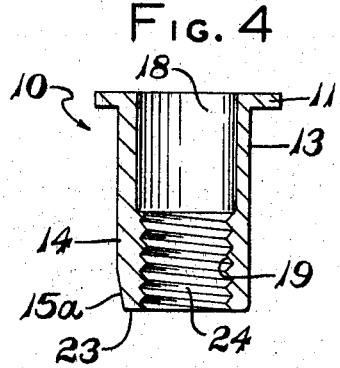
FIG. 4
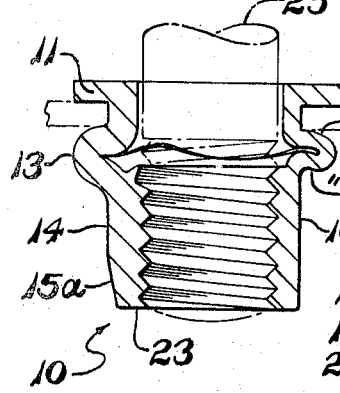
FIG. 5
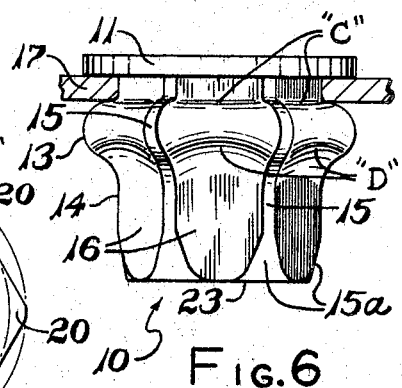
FIG. 6
FIG. 3
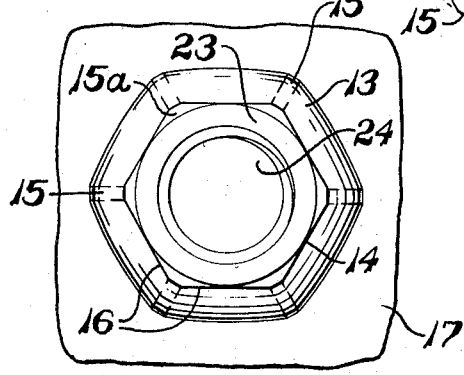
FIG. 7
INVENTOR.
JAMES R. SHACKELFORD
BY Dwight L. Moody
ATTY.

United States Patent Office 3,304,830
Patented Feb. 21, 1967

3,304,830
EXPANSIBLE HOLLOW RIVET HAVING A
POLYGONAL SHANK
James R. Shackelford, Cuyahoga Falls, Ohio, assignor to
The B. F. Goodrich Company, New York, N.Y., a corporation of New York
Continuation of application Ser. No. 401,270, Oct. 2, 1964, which is a continuation of application Ser. No. 48,433, Aug. 9, 1960. This application Mar. 14, 1966, Ser. No. 534,250
8 Claims. (Cl. 85—70)

This application is a continuation of application Serial No. 401,270 filed October 2, 1964, and now abandoned, which was in turn a continuation of application Serial No. 48,433, filed August 9, 1960, and now abandoned.

This invention relates to rivets and in particular to expansible hollow rivets resistant to turning relative to the work.

Prior internally threaded expansible hollow rivets having a head and an axially-extending shank cylindrical in shape have in the attached condition sometimes turned relative to the work, when an article-attaching machine screw is tightened in the rivet sufficiently to produce tension in the screw and hence apply torque to the attached rivet. Heretofore, some rivets of this type have been provided with a radial key integrally united with the underside of the head to resist relative turning, but these rivets require the provision of a corresponding radial slot in the margin of the circular hole in the work through which the rivet shank extends. For some applications, the provision of a slotted hole is objectionable from the cost standpoint together with the necessity of exercising considerable care that the key is disposed in the slot before and while the rivet is being attached to the work. Also, these rivets, with or without key, require precautions by the tool operator to avoid applying axial force substantially greater than is required to axially shorten the rivet and to form the desired optimum annular outward bulge in the shank, otherwise shear of the internal threads of the rivet takes place.

A principal object of the invention is to provide an improved expansible hollow rivet having high resistance to turning relative to the work in which the rivet is attached, together with increased resistance to peripheral shear of its wall during formation of a peripheral outward bulge.

Other objects of the invention are to provide an improved rivet with a hollow shank at least in part generally prismatic in shape; to provide for attaching the rivet to the work by operation from one side only thereof; to provide for mounting the rivet in a circular aperture or in a polygonal aperture in the work, the polygonal aperture substantially corresponding to the peripheral polygonal configuration of the rivet shank; to provide for attachment of the rivet in polygonal apertures formed in the work by a new punch with sharp corners or by a used punch with worn corners; to provide for a secondary peripherally continuous gripping of the work between the head and the bulge of the rivet together with a primary gripping of the work at the regions adjacent the corners of the prismatic shank; to provide for high torque resistance or strength of the rivet and for reduced length of the rivet shank; and to provide for simplicity of construction, convenience of installation and low cost of manufacture and for effectiveness of operation.

These and other objects and advantages will be apparent from the following description.

In the accompanying drawings which form a part of this specification and in which like numerals are employed throughout to designate like parts:

FIG. 1 is a front view of an expansible hollow rivet having a shank hexagonally prismatic in shape and constructed in accordance with and embodying the invention;

FIG. 2 is a plan view looking from the free end of the shank toward the head of the rivet;

FIG. 3 is a plan view on an enlarged scale taken at a position midway the length of the expansible portion of the shank and looking toward the threaded end portion of the shank, section lines being omitted for clarity of illustration;

FIG. 4 is a longitudinal cross-sectional view of the rivet taken along line 4—4 in FIG. 2;

FIG. 5 is a longitudinal cross-sectional view like FIG. 4 but on an enlarged scale showing the rivet axially shortened and attached to the work which is shown in broken lines;

FIG. 6 is a front view on an enlarged scale showing the rivet attached to the work, parts being broken away and in section; and FIG. 7 is a plan view of the rivet shown in FIG. 6 looking from the free end of the shank toward the work, parts being broken away.

In the illustrative embodiment of the invention shown in FIGS. 1 to 7, the construction of expansible hollow rivet 10 includes a head end portion or a head 11 and an integral axially-extending shank 12 generally prismatic in shape. That is, the shank has an external surface composed of longitudinally extending faces joined at longitudinal edges so that the external shape of the cross section is generally polygonal. The head end portion of the rivet 10 may be pre-formed to provide head 11 which may be of the flat type shown, or the round type, or the countersunk type. The rivet 10 is preferably made of ductile metal material such, for example, as aluminum alloy, steel, stainless steel, and brass, but may be made of thermoplastic material preferably capable of forming a permanent peripheral bulge and suitable for applications where metal is not required.

The prismatic hollow shank 12 has a circumferentially continuous wall providing an outwardly expansible portion 13 intermediate the head 11 and a non-expansible portion 14, preferably an end portion, of the shank spaced from the head. The shank 12 has an outer surface, the periphery of which in cross section is of a polygonal configuration substantially the entire length of the shank.

The prismatic shank 12 preferably has rounded edges 15, 15, the radius of each being the radius of the circumscribed circle A shown in broken lines in FIG. 3. The preferred embodiment of the invention shown in FIG. 1 has six substantially planar faces 16, 16 although not necessarily limited thereto, but may have a greater or lesser number of planar faces in substantially parallel relation to the longitudinal axis of the rivet and with adjacent faces coming together at edges approximately at the intersection of their planes. Good results have been obtained with a rivet shank hexagonally prismatic in shape with rounded edges 15, 15 and with planar faces 16, 16 each tangential to the reduced diameter inscribed circle B shown in broken lines in FIG. 3. This hexagonal construction has advantageously made feasible a reduction in number of complete thread convolutions and in over-all length of the shank as compared to that of a cylindrical shank having an outside diameter equal to that of the inscribed circle B, e.g., equal to the transverse or lateral dimension between opposed faces 16, 16 of the hexagonal shank, and will be discussed more fully hereinafter.

The head 11 and hexagonally prismatic expansible portion 13 have a cylindrical counterbore or central bore 18, that is, one of circular cross-section and of uniform diameter therethrough, and the hexagonally prismatic non-expansible end portion 14 has a uniform bore 24 therethrough providing an inner surface 19, preferably threaded, of circular cross section of lesser diameter than that of the central bore 18 in the expansible portion 13. Thus, in contrast to a cylindrical shank of an outside diameter equal to the inscribed circle B, the regions adjacent the rounded edges 15, 15 of the prismatic expansible 13 and end 14 portions constitute axially-extending parallel columnar supports 20, 20 resisting peripheral, i.e., circumferential shear of the wall of the expansible portion 13 adjacent its juncture with the end 14, but permitting radially outward bulging of the portion, while resisting objectionable radially outward bending of the end portion 14, especially at its upper part adjacent the expansible portion 13, when the rivet is axially shortened, as shown especially in FIGS. 5 and 6.

The prismatic shape of the shank 12 advantageously provides an increased volume of wall material constituting each columnar support 20 which is greatest in thickness at each edge 15 and which gradually decreases in thickness peripherally away from the edge 15 to the points of tangency 21, 22 of adjacent faces 16, 16 with the inscribed circle B; and hence the columnar supports 20, 20 are each generally triangular in cross-section as indicated by the numerals 15, 21, 22 and as shown in FIG. 3. This produces maximum resistance to peripheral shear of the wall of the expansible portion 13 immediately at the edges 15, 15 and produces maximum cold flow and work hardening of the wall material of the columnar supports 20, 20 immediately at the longitudinal edges of said portion 13, when the rivet is axially shortened and outwardly bulged. The adjacent wall material of the columnar supports 20, 20 to either side of each of the edges 15, 15 produces at the expansible portion 13 effective resistance to peripheral shear of the bulged wall intermediate the spaced corners 15, 15.

The peripherally continuous wall of the prismatic hollow shank is of reduced thickness and stiffness throughout the outwardly expansible portion 13 at the counterbore 18, as compared to its thickness and stiffness throughout the internally threaded non-expansible end portion 14, and has a non-uniform wall thickness in the expansible portion which continuously increases from a minimum in the middle of each face 16 to a maximum at the edges 15, 15 where the faces come together. This assures effecting the desired radially outward bulging of the expansible portion 13 before the wall of the end portion 14 can possibly bend outwardly, especially at its upper part nearest the expansible portion 13, when the rivet is axially shortened.

The prismatic expansible portion 13 has sufficient axial length to provide the desired grip range of the rivet 10 for accommodating work 17 of different thickness, that is, the range between the maximum thickness of work and the minimum thickness of work in which a particular size rivet 10 can be properly installed. When the expansible portion 13 extends through a hexagonal aperture and is radially outwardly bulged as shown in FIGS. 5 and 6, the peripherally continuous wall thereof at the edges 15, 15 has substantially the bulged configuration in cross-section shown at the left-hand side of FIG. 5, while the relatively thinner part of the wall midway between the corners 15, 15 has substantially the bulged configuration in cross-section shown at the right-hand side of FIG. 5.

Maximum gripping or clamping force exerted against the work 17 between the head 11 and the outwardly bulged wall, is effected immediately at each of the edges 15, 15 where such bulged wall is thickest, inasmuch as a substantial radial extent of the bulged wall contacts the underside of the work 17. However, peripheral continuity of gripping force against the work is effected by the outwardly bulged wall of portion 13 where its uppermost surface continuously contacts the marginal edge of the hexagonal aperture in the work. It will be noted that the upper outer surface of the bulged wall between the edges 15, 15 is in part slightly bowed axially away from contact with the work radially outward of said marginal edge, as indicated by the letter C and shown in FIGS. 5 and 6; whereas the lower outer surface of the bulged wall between the edges 15, 15 is slightly bowed axially in the opposite direction, as indicated by the letter D. This axial bowing and also the differences in the bulged configuration in cross-section of the wall of the expansible portion 13 is largely the result of the differential in stretching and bending characteristics of the prismatic wall of the latter said portion 13 produced by the columnar supports 20, 20.

The relatively greater total thickness and stiffness of the peripherally continuous wall of the prismatic internally threaded non-expansible end portion 14 at each of its columnar supports 20, 20 provides increased resistance throughout the length of the end portion 14 to radially outward bending thereof, while the prismatic expansible portion 13 is being outwardly bulged to the configuration shown in FIGS. 5 and 6. It has been found that a standard commercial cylindrical shank type of hollow rivet with an internally threaded end portion of an outside diameter equal to that of inscribed circle B and standard uniform wall thickness generally bends radially outward at such end portion, during the bulging operation, under the influence of the radially outward component of the axial force applied through the threads of the pull-up stud or draw rod 25 to the internal threads of the said end portion. Thus, at least one or more internal thread convolutions nearest the counterbore are forcibly moved radially outward and axially distorted first so that they only partially engage the threads of the draw rod, and then the adjacent thread convolutions are moved radially and axially distorted a progressively relatively decreasing extent. Since the standard uniformly thick wall of the said cylindrical end portion bends radially outward in a progressively increased manner at the region of the annular bulge, additional thread convolutions are required to be provided to carry the load.

The prismatic internally threaded end portion 14 of this invention, by virtue of the columnar supports 20, 20, effectively resists such objectionable radially outward bending of its peripheral wall despite the influence of said radially outward component of the axial force acting on the internal threads; hence even the uppermost thread convolutions remain substantially undistorted and continuously in substantially full engagement with the threads of the pull-up stud or draw rod 25, and all the thread convolutions of the end portion 14 effectively transmit the axial force applied through the draw rod 25. This eliminates the need of one or more additional thread convolutions to compensate for the above-mentioned axial distortion, thereby making it possible to reduce the total number of complete thread convolutions in the prismatic end portion 14 without reduction of its load-carrying capacity. For this reason the axial length of such end portion 14 is less than that of the threaded end portion of the standard commercial cylindrical shank type of rivet without decreasing the preferred optimum ratio of the upsetting load i.e. force required to axially shorten and outwardly bulge the rivet to the force applied axially through the pull-up stud and required to shear the threads of the rivet.

For example, a standard commercial rivet having a cylindrical hollow shank of uniform diameter equal to the diameter of the inscribed circle B (FIG. 3) i.e. the dimension between opposed planar sides 16, 16 of the hexagonal rivet shank 12, requires about twenty-five percent (25%) more thread convolutions of the 6-32 size, for example, in the cylindrical internally threaded end portion, than does the hexagonal end portion 14 of the rivet 10 to provide the above-mentioned optimum ratio.

The hexagonally prismatic shank 12 at its free end remote from the head 11 may have the rounded edges 15, 15 tapered inwardly, as indicated at 15a, 15a, toward the longitudinal axis of the rivet, while maintaining the rounded configuration, so that the end face 23 is substantially circular in plan with a diameter approximately equal to that of the inscribed circle B, as shown especially in FIGS. 1 and 2. This construction advantageously facilitates producing the metal rivet economically from a rivet blank of round metal bar stock, for example, by utilizing suitable dies and machine tools, and also facilitates the initial insertion of the rivet through either a circular aperture or a hexagonal aperture in the work.

The rivet 10, as shown in FIGS. 5, 6 and 7, has its hexagonally prismatic shank 12 mounted in an aperture of corresponding polygonal configuration which has been punched in the work 17 which, for example, may be aluminum or steel sheet metal. The rounded edges 15, 15 advantageously not only reduce the axial force required to outwardly bulge the rivet at its expansible portion 13 as compared to the force required, if the edges were sharp; but also facilitate mounting the rivet in hexagonal apertures which have been produced by either a new punch with sharp corners or a worn punch with rounded corners. Tests comparing rivets having shanks hexagonally prismatic in shape with sharp edges vs. shanks hexagonally prismatic in shape with rounded edges have shown that the sharp edge construction not only tended to promote circumferential shear of the wall of the expansible portion 13 in its radially outwardly bulged condition, but objectionably decreased the factor of safety as between the required axial shortening force and the tensile strength of the pull-up stud 25 of the tool.

The expansible hollow rivet 10 may have the prismatic shank 12 inserted first through the hexagonal aperture in the work 17 and then the pull-up stud 25 inserted through the head 11 and threadedly engaged with the end portion 14; or in the alternative, the rivet 10 may be threaded first on the threaded end of the pull-up stud and then inserted shank end first through the hexagonal aperture in the work 17. For either procedure, the next step is the application of axial force by the pull-up stud 25 in the direction toward the head 11, while the latter is held in contact with the work, whereby the prismatic outwardly expansible portion is outwardly bulged to the configuration shown in FIGS. 5 and 6. It is to be understood that the rivet can also be attached to the work by means of a suitable press (not shown) without requiring the use of a pull-up stud 25.

After attachment of the rivet 10 to the work, as shown in FIG. 6, the pull-up stud 25 is unscrewed from the rivet and entirely removed therefrom so that a screw fastener (not shown) for attaching an article to the work 17 can be inserted into the rivet and threadedly engaged with the end portion 14. The screw fastener can be safely tightened to a tensioned condition sufficient to apply torque equivalent to at least the maximum upset load of the rivet without relative turning of the attached rivet in the work and with little or no likelihood of stripping the threads of the rivet. The hexagonally prismatic shank construction also effectively prevents relative turning of the rivet, while it is being attached to the work.

Tests have shown that the rivet 10, when installed in a circular aperture in the work, has substantially greater torque resistance such, for example, as 33⅓% greater torque resistance as compared to that of a standard commercial cylindrical shank type of rivet with the same size threads as the rivet 10 (for example, ⅜"–16 size threads) and with the outside diameter of the cylindrical shank equal to the dimension between opposed faces 16, 16 of the rivet 10. This advantageous result is produced in part by the relatively greater clamping force exerted against the work by the columnar supports, particularly at each of the rounded edges 15, 15, of the prismatic expansible portion 13, and in part by the localized bite of each of the rounded edges 15, 15 into the material of the lower edge region of the margin of the circular aperture in the work thereby providing an anti-rotational positive locking function at each edge 15. This bite of the rounded edges 15, 15 results from the limited cold flow of the material of the lower edge region of the margin of the circular aperture under the influence of the initially relatively great, radially outward forces exerted by the rounded edges 15, 15, when the expansible portion 13 is being axially shortened and outwardly bulged.

Thus, the improved rivet 10 is adapted for installation in either a circular aperture or a polygonal aperture and provides in either case increased torque strength and increased resistance to shear of the wall of the expansible portion.

Variations may be made without departing from the scope of the invention as it is defined in the following claims.

I claim:
1. An expansible hollow rivet comprising
   (1) a head and
   (2) an integral axially-extending peripherally continuous shank having a polygonal external configuration with a plurality of planar parallelogram faces extending continuously from the head along the shank in parallel relation to the longitudinal axis of the rivet with adjacent faces meeting in corners at the intersection of their planes,
   (3) said shank including an outwardly expansible portion adjacent and extending axially in the direction away from said head to a hollow non-expansible portion of the shank spaced from said head,
   (4) the outwardly expansible portion having a central bore of circular cross-section extending axially therethrough to a concentric bore of lesser diameter in said non-expansible portion of the shank providing
   (5) a non-uniform wall thickness in said expansible portion and in said non-expansible portion which continuously increases peripherally from a minimum at the zones midway the corners thereof to a maximum at said corners,
   (6) the number of said planar parallelogram faces being such that, when the peripherally continuous wall of said expansible portion is radially outwardly bulged to contact a side of the work, the bulged portion has a polygonal external periphery and maximum clamping force is exerted locally on the work at the said corners of the bulged wall, while the external surface of the bulged wall between each pair of corners and facing the work has a slightly curved contour in the axial direction away from the work but the opposite external surface between said each pair of corners has a curved contour in the opposite axial direction.

2. An expansible hollow rivet of ductile metal comprising
   (1) a head and
   (2) an integral axially-extending peripherally continuous shank having a regular polygonal external configuration in transverse cross-section and a plurality of planar parallelogram faces extending continuously from the head along the shank in parallel relation to the longitudinal axis of the rivet with adjacent faces meeting in corners at the intersection of their planes,
   (3) said shank including an outwardly expansible portion extending from said head to a hollow end portion of the shank spaced from said head,
   (4) the head and the outwardly expansible portion having a central bore of uniform diameter extending axially therethrough to a concentric bore in said end portion of the shank providing
   (5) a non-uniform wall thickness in said expansible portion and in said end portion which continuously increases peripherally from a minimum at the zones midway the corners thereof to a maximum at said corners,
   (6) the number of said planar parallelogram faces being such that, when the peripherally continuous wall of said expansible portion is radially outwardly bulged into contact with a side of the work, the bulged portion has a polygonal external periphery and maximum clamping force is exerted locally on the work at the respective corners of the bulged wall, while the external surface of the bulged wall between each pair of corners and facing the work has a slightly curved contour in the axial direction away from the work but the opposite external surface between said each pair of corners has a curved contour in the opposite axial direction, (7) said hollow end portion of the shank having a threaded inner surface of lesser major diameter than that of the central bore in said expansible portion, (8) whereby the regions adjacent the said corners of the expansible and end portions of the shank constitute columnar supports resisting peripheral shear of said expansible portion but permitting radially outward bulging thereof, while resisting radially outward bending of said end portion of the shank, when the rivet is axially shortened.

3. An expansible hollow rivet of ductile metal comprising (1) a head and (2) an integral axially-extending peripherally continuous shank having a regular polygonal external configuration in transverse cross-section and six planar parallelogram faces extending continuously from the head along the entire shank in parallel relation to the longitudinal axis of the rivet with adjacent faces meeting in rounded corners at the intersection of their planes, (3) said shank including an outwardly expansible portion extending from said head to a hollow end portion of the shank spaced from said head, (4) the head and the outwardly expansible portion having a central bore of circular cross-section and uniform diameter extending axially therethrough to a concentric bore in said end portion of the shank providing, (5) a non-uniform wall thickness in said expansible portion and in said end portion which continuously increases peripherally from a minimum at the zones midway the corners thereof to a maximum at said corners, (6) said hollow end portion of the shank having a threaded inner surface of circular cross-section and of uniform lesser major diameter than that of the central bore in the said expansible portion, (7) whereby the regions adjacent the rounded corners of the expansible portion and the end portion of the shank constitute columnar supports resisting peripheral shear of said expansible portion but permitting radially outward bulging thereof, while resisting radially outward bending of said end portion of the shank, when the rivet is axially shortened by force applied through a threaded member inserted from the head end of the rivet and threadedly engaged with the threads in said end portion.

4. A hollow rivet of the class which is expansibly deformable by axial compression to engage a work piece, the rivet having (1) a head;

(2) a shank from which said head laterally projects, the shank being integral with the head and having (a) a non-expansible portion remote from the head with an axial internally threaded bore, and (b) an expansible portion which is circumferentially continuous and is of a length greater than the thickness of an intended work piece and which connects the head to the non-expansible portion;

(3) a bore of circular cross section extending axially through said expansible portion to said internally threaded bore;

(4) an external surface on the shank consisting of a series of longitudinal faces which are substantially flat, parallel to the axis of said bore, of substantially uniform width, and which extend without interruption from the expansible portion to and along the external surface of said non-expansible portion, and said faces meeting each other at corners all of which are convex to the external surface of the shank to form a series of longitudinal edges along said external surface, so that (a) the shank is generally polygonal in external cross section throughout its length, and (b) the thickness of the wall of the shank is substantially greater at said edges than at the faces between said edges, (5) whereby axial compression urging the head and the non-expansible portion toward each other causes circumferential expansion and folding of the wall of said expansible portion immediately behind the work piece to grip the work piece between such folded portion of the shank and said head and to urge said edges and faces of the shank toward a position of engagement with such work piece.

5. A rivet according to claim 4 made of ductile metal.

6. A rivet according to claim 4 in which the edges defined by adjoining faces on said external surface are rounded.

7. A rivet according to claim 4 in which said faces are flat and are all of equal lateral width so that in cross section the external shape of said shank is a regular polygon.

8. A rivet according to claim 4 in which there are six flat faces so that in cross section the external shape of said shank is generally a regular hexagon.

References Cited by the Examiner

UNITED STATES PATENTS

| 1,120,369 | 12/1914 | Booraem et al. | 85—83 |
| 2,150,080 | 3/1939 | Rawlings | 85—83 |
| 2,763,314 | 9/1956 | Gill | 85—70 |
| 2,887,926 | 5/1959 | Edwards | 85—70 |
| 2,914,106 | 11/1959 | Boyd | 85—70 |

FOREIGN PATENTS

| 672,053 | 5/1952 | Great Britain. |

CARL W. TOMLIN, *Primary Examiner.*

THOMAS F. CALLAGHAN, *Examiner.*

M. PARSONS, JR., *Assistant Examiner.*